United States Patent [19]
Jensen

[11] Patent Number: 5,156,215
[45] Date of Patent: Oct. 20, 1992

[54] COUNTERWEIGHT ASSEMBLY FOR CRAWLER TRACTOR

[75] Inventor: Tony A. Jensen, Clancy, Mont.

[73] Assignee: Golden Sunlight Mines, Inc., Whitehall, Mont.

[21] Appl. No.: 723,586

[22] Filed: Jul. 1, 1991

[51] Int. Cl.$^5$ ............................................. A01B 35/02
[52] U.S. Cl. ...................... 172/611; 37/98; 37/117.5; 172/250; 280/759; 414/719
[58] Field of Search ............... 414/719; 212/195–198, 212/178; 280/759, 758; 172/611, 464, 250; 37/117.5, 98, DIG. 3, DIG. 12

[56] References Cited

U.S. PATENT DOCUMENTS

| | | | |
|---|---|---|---|
| 1,852,200 | 4/1932 | Camp | 280/759 |
| 2,261,870 | 11/1941 | Cardwell | 212/8 |
| 3,074,190 | 1/1963 | Wahl | 37/236 X |
| 4,081,035 | 3/1978 | Bowen | 172/611 X |
| 4,279,348 | 7/1981 | Harper et al. | 212/196 |
| 4,299,530 | 11/1981 | Schaeff | 414/719 |
| 4,502,709 | 3/1985 | Schaeff | 280/758 |
| 4,861,069 | 8/1989 | Gunter | 280/758 |
| 4,991,659 | 2/1991 | Stepe et al. | 172/464 |

FOREIGN PATENT DOCUMENTS 482937 5/1952 Canada ............................ 280/758

*Primary Examiner*—Michael S. Huppert
*Assistant Examiner*—Donald W. Underwood
*Attorney, Agent, or Firm*—Flehr, Hohbach, Test, Albritton & Herbert

[57] ABSTRACT

A crawler tractor is disclosed with a counterweight assembly which affords optimum weight distribution and traction for operation on steep slopes and grades. The assembly includes a counterweight body having a shank which is carried by a housing mounted by a support arm weldment on the rear end of the tractor. The shank is releasably engaged with the housing. Hydraulic actuators are provided to move the counterweight to a lowered position for backing the tractor uphill, and for raising the counterweight for dozing in a downhill direction. One embodiment provides for selective fore and aft positioning of the counterweight relative to the tractor in accordance with operating conditions.

12 Claims, 3 Drawing Sheets

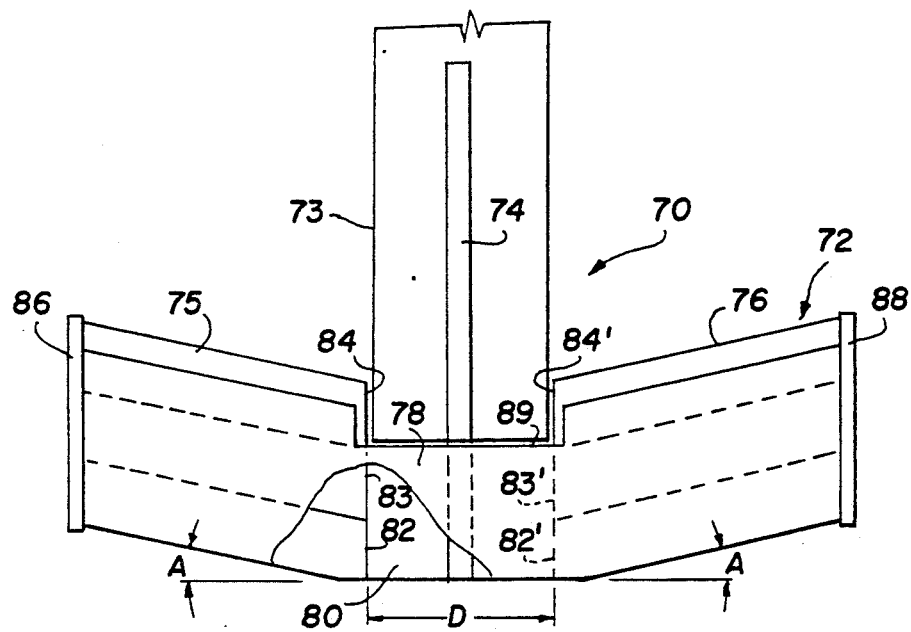
FIG.6
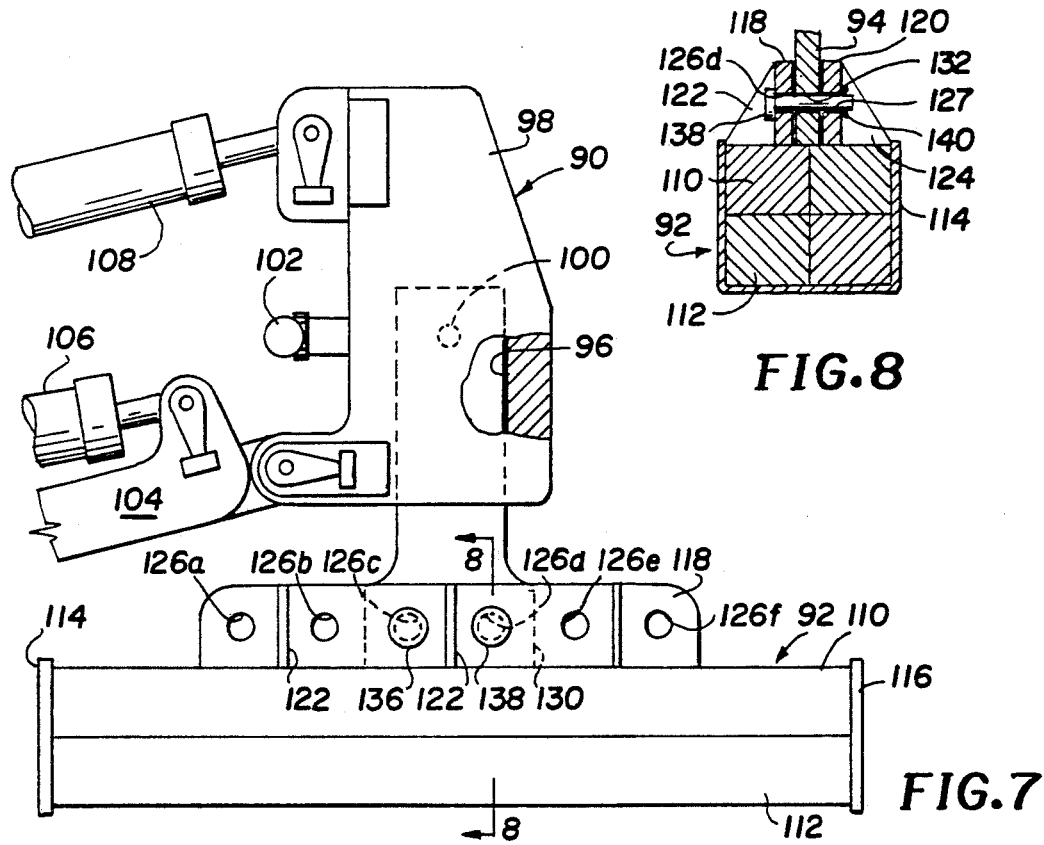
FIG.8
FIG.7

COUNTERWEIGHT ASSEMBLY FOR CRAWLER TRACTOR

BACKGROUND OF THE INVENTION

1. Field of the Invention

This invention relates in general to off-road endless track type vehicles, also called bulldozers or crawler tractors. More particularly, the invention relates to counterweight attachments for crawler tractors for use where the vehicle is operated on steep slopes or grades.

2. Background Art

Conventional crawler tractors have dozer blades at the front which are employed for such jobs as dozing and moving or scraping earth, boulders, tree stumps and the like. A number of different attachments can be provided for specialized work. One such attachment is a side-mounted boom structure for laying pipe. Another prior art attachment for a tractor type vehicle is a side-mounted hoisting boom. Another common crawler tractor attachment is a rear-mounted ripper blade which can be used for such purposes as tearing up concrete or asphalt pavement or compacted earth.

Off-road vehicles have previously been provided with counterweights for various purposes. The relevant prior art includes U.S. Pat. No. 4,279,348 which provides a counterweight that swings to one side of a crawler vehicle for balancing a pipe laying boom assembly. U.S. Pat. No. 2,261,870 provides another side-mounted counterweight for use with hoisting machinery on a crawler tractor. U.S. Pat. No. 4,299,530 provides a fore and aft shifting counterweight device on a wheeled front end loader which has a backhoe. U.S. Pat. No. 4,502,709 provides a lateral shifting counterweight which operates when the frames of an articulated vehicle pivot. U.S. Pat. No. 4,861,069 provides an arrangement for a four-wheeled tractor in which a counterweight shifts left or right when the vehicle is on a lateral slope. U.S. Pat. No. 1,852,200 provides a road scraper in which a fixed counterweight is provided at the rear to balance a load at the front.

The prior art counterweight devices that have heretofore been provided do not effectively address the problems encountered when a crawler tractor uses its blade to scrape or push on a steep grade or slope. For example, in dozing operations where the tractor backs up a steep slope, the tractor center of gravity is displaced forward of the tracks from the position it would normally occupy when on level ground. This results in a loss of traction which reduces dozing efficiency.

SUMMARY OF THE INVENTION

In summary, the present invention provides a counterweight assembly for a crawler tractor. A counterweight body of predetermined weight is carried by a support arm weldment having a proximal end which is pivotally mounted to the rear of the tractor. The support arm's distal end is pivotally mounted to the lower end of a ripper housing, and the upper end of the housing is linked to the tractor by hydraulic actuators. A vertical shank on the counterweight body is releasably mounted to the housing. This displaces the tractor's combined center of gravity rearwardly. The hydraulic actuators are operated to pivot the counterweight body down to achieve optimum weight distribution and traction for backing up steep slopes. The counterweight body is pivoted up, when dozing downhill, as required to yield appropriate ground clearance. One embodiment provides an arrangement for selectively positioning a longitudinally oriented counterweight body so that its center of gravity is moved fore or aft in accordance with operating conditions.

The foregoing and additional objects and features of the invention will appear from the following description in which the embodiments have been set forth in detail in conjunction with the accompanying drawings.

BRIEF DESCRIPTION OF THE DRAWINGS

FIG. 6 is an end elevational view of a counterweight body in accordance with another embodiment of the invention.

FIG. 7 is a side elevational view of components of a counterweight assembly in accordance with another embodiment.

FIG. 8 is a cross-sectional view taken along the line 8—8 of FIG. 7.

DESCRIPTION OF THE PREFERRED EMBODIMENTS

Figure 1:
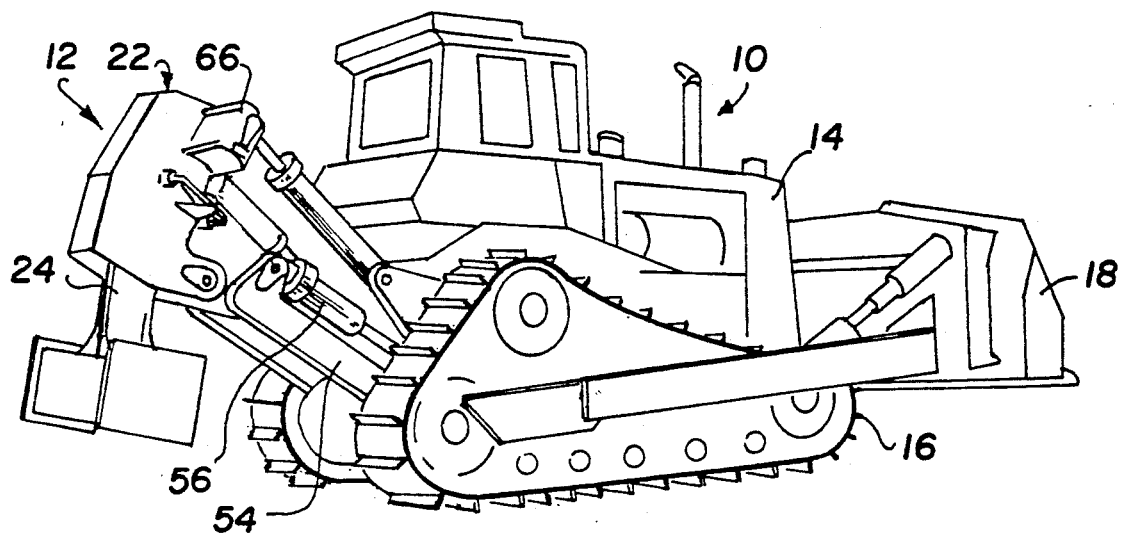
FIG. 1 is a perspective view illustrating a crawler tractor incorporating a counterweight assembly in accordance with the invention.

In the drawings FIG. 1 illustrates generally at 10 a crawler tractor which mounts at its rear end a counterweight assembly 12 incorporating a preferred embodiment of the invention. The crawler tractor which is illustrated is typical and comprises a chassis 14 housing an engine which drives a pair of endless tracks 16. A dozer tools such as dozer blade 18 is mounted on arms at the front of the tractor.

Figure 2:
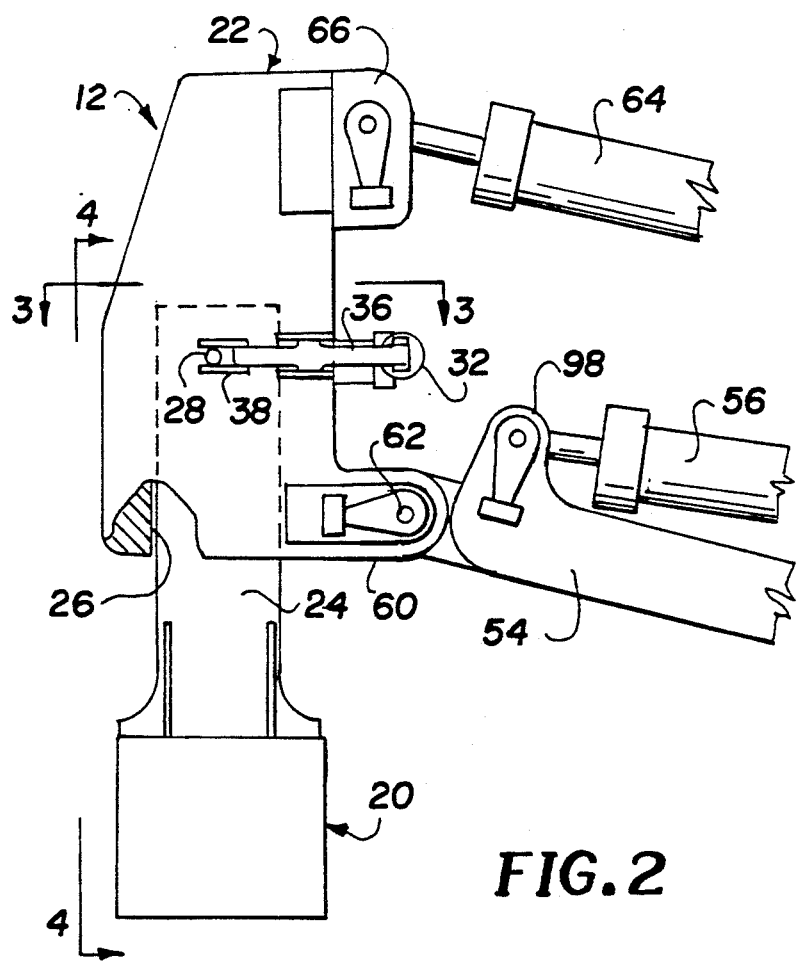
FIG. 2 is a fragmentary side elevational view, to an enlarged scale, of components of the counterweight assembly shown in FIG. 1.
Figure 3:
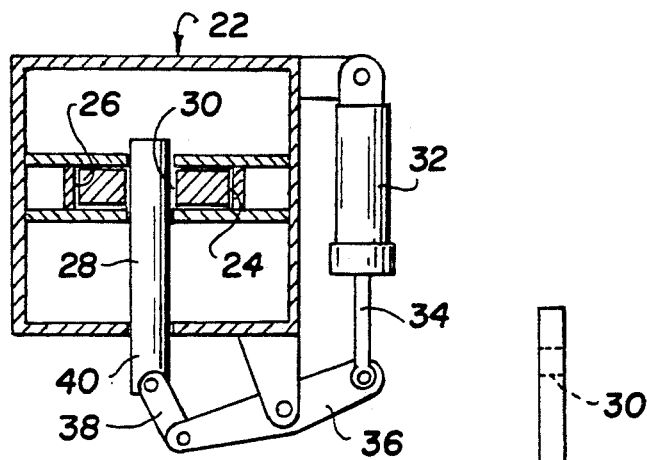
FIG. 3 is a cross-sectional view of the counterweight assembly taken along the line 3—3 of FIG. 2.
Figure 4:
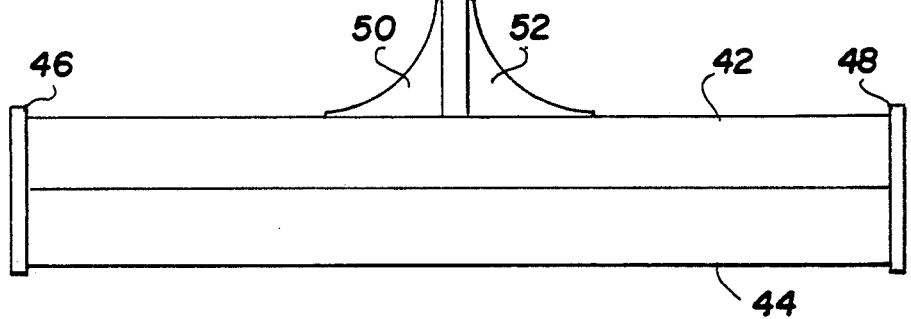
FIG. 4 is an end elevational view taken along the line 4—4 of FIG. 2 showing the counterweight body which is a component of the counterweight assembly.

Counterweight assembly 12 includes a counterweight body 20, which is shown in detail in FIGS. 2-4. Counterweight body 20 hangs below and is supported from a housing 22 by a shank 24. The housing can be a ripper housing from which the ripper blade, not shown, has been removed. The shank 24 is mounted on and projects upwardly from the mid-span of counterweight body 20, and the shank is inserted into a vertical opening 26 which is formed centrally through the housing.

FIG. 3 shows the mechanism for releasably securing the counterweight body to the housing. A lock pin 28 is mounted on the housing to slide laterally into and out of engagement with a hole 30 formed in the upper end of the shank. The lock pin is operated by means of an hydraulic actuator 32 which is mounted on the front side of the housing. Actuating rod 34 is connected to one end of a crank 36, the opposite end of which is connected through a linkage 38 to the end 40 of the lock pin which projects outwardly from the side of the housing. When actuator 32 is retracted, the lock pin is withdrawn to free the shank, and when the actuator is extended the lock pin slides inwardly for engagement with the shank hole. The releasable feature permits the counterweight body to be removed and replaced with the ripper blade, as when working on level terrain.

In the embodiments of FIGS. 1–5 counterweight body 20 is elongate in an axis transverse to the longitudinal axis of the crawler tractor. The weight of body 20 is predetermined in accordance with the requirements of a particular application, such as the size of the crawler tractor and maximum slope or grade of the terrain upon which the unit will operate. A typical example is a D8N crawler tractor, which is a trademark of the Caterpillar company, having a gross weight of 79,381 pounds with the front blade and single shank ripper. This requires a combined weight of 9,367 pounds for the counterweight body and shank, which is at least substantially 11% of the tractor's gross weight. The center of gravity of the tractor, including the dozer blade but without the counterweight assembly, is approximately shown at CG-T in FIG. 5. With the counterweight attached the resultant center of gravity is approximate at CG-R.

Counterweight body 20 is preferably comprised of a cluster of four 8' length steel bars 42, 44 (FIG. 4) each having rectangular cross sections of 8.25" by 10". The steel bars are assembled in side-by-side relationship and joined together and welded at their ends with 1½" steel plates 46, 48.

Shank 24 is made of a steel plate of 3" thickness, 46" length and 13" width. The steel plate is secured by welding across the top of the steel bars 42, 44 at their mid-span, and four gussets 50, 52 are welded at the juncture of the plate and steel bars for reinforcement.

The housing 22 and thereby the counterweight body are supported at a predetermined extension distance rearwardly from the tractor by means of a support arm weldment 54. The weldment is pivotally mounted at its two proximal ends to the lower rear end of the tractor. The weldment is raised and lowered by means of a pair of hydraulic actuators 56 which have their head ends pivotally mounted to the rear of the tractor and their rod ends pivotally mounted to the weldment distal ends 58. A clevis 60 which projects forwardly from the lower end of the housing 22 is mounted for pivotal movement about a transverse pin 62 carried on the weldment. The housing and thereby counterweight 20 are pivoted back and forth about pin 62 in an upright plane by means of hydraulic actuators 64. The head end of these actuators are pivotally mounted to the tractor rear, and the rod ends are pivotally mounted to side extensions 66 at the upper end of the housing.

Figure 5:
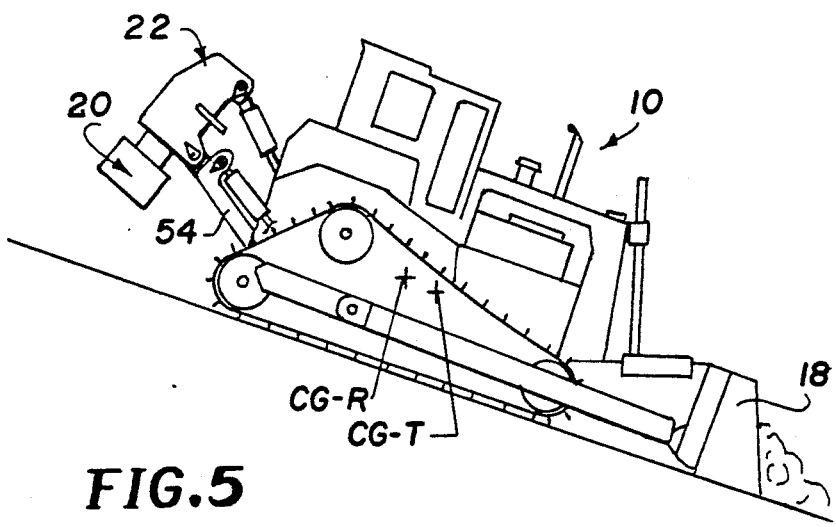
FIG. 5 is a side elevational view of the tractor in FIG. 1 illustrating the operation on a typical steep slope.

When it is desired to back the tractor up a steep slope the lower actuators 56 are extended to pivot the support arm weldment 54 downwardly, which is in a counterclockwise direction as viewed in FIG. 5. This lowers the counterweight body toward the ground, and also moves the body center of gravity further back from the tractor a short distance. The resultant center of gravity is then at approximately the position CG-R illustrated in FIG. 5. With front dozer blade 18 raised, the tractor can now back up the hill with optimum weight distribution and traction. For dozing downhill with the front blade lowered, the actuators 56 are retracted to pivot support arm weldment 54 upwardly. This raises the counterweight clear of the ground to minimize damage, such as when the rear end of the tractor approaches the ground as the tractor turns upwardly at the end of a dozing stroke.

FIG. 6 illustrates a modified counterweight assembly 70 in accordance with another embodiment of the invention. The assembly 70 is comprised of a counterweight body 72 and vertical shank 74 which is adapted to releasably fit within the vertical opening of a ripper housing, the outline of which is shown in phantom view at 73. The ripper housing is mounted on the end of a crawler tractor as described for the embodiment of FIGS. 1–5.

Counterweight body 72 of this embodiment is comprised of a pair of steel bar clusters 75 and 76 secured by welding between a pair of upstanding flat side plates 78 and 80. The side plates are also welded to the front and back lower edges of shank 74. The outboard ends of the side plates incline upwardly at an angle A, which preferably is in the range of 10° to 30° from horizontal. The cluster 75 is comprised of three steel bars 82, 83, 84 of rectangular cross-section. Cluster 76 is also comprised of three steel bars 82', 83', 84' of rectangular cross-section. In each cluster, the three bars are stacked vertically and welded together between the side plates. The inner ends of the bars of the two clusters are spaced apart a distance D, preferably on the order of two feet, to define an open box-like space in which the shank is centered. Upwardly concave cutouts 89 are formed in the upper midsection of each side plate. The cutouts and spacing between the bars provide clearance so that the lower end of the ripper housing can be mounted closer to the counterweight body. A pair of end plates 86, 88 are welded to the outer ends of the clusters and side plates.

The closer mounting of the ripper housing to the counterweight body and the upward incline of the steel bar clusters provides greater ground clearance which prevents the counterweight from hanging up such as when the unit makes a transition from a steep slope to flat ground.

FIGS. 7 and 8 show another embodiment providing an assembly 90 with a counterweight body 92 which can be repositioned for selectively shifting the center of gravity of the counterweight fore and aft as required by particular operating conditions. In this embodiment a separate shank 94 is provided with its upper end adapted to fit within the opening 96 of a ripper housing 98. A transverse hole 100 in the upper end of the shank slidably receives a lock pin (not shown) which is operated by an actuator 102 in the manner described for the embodiments of FIGS. 1–5 so the shank can be secured to or released from the housing.

The ripper housing is supported from the rear end of the tractor by a support arm weldment 104 which is raised and lowered by hydraulic actuators 106. Actuators 108 pivot the ripper housing relative to the support arm weldment in the manner explained for the first embodiment.

Counterweight body 92 is elongate in a direction longitudinally of the tractor. The body is comprised of a cluster of four steel bars 110, 112 of rectangular cross-section which are assembled in side-by-side relationship and joined together and welded at their ends with steel plates 114, 116. A pair of elongate, upstanding mounting plates 118, 120 are welded in spaced-apart relationship along the upper surface of the counterweight body. A plurality of gussets 122, 124 are welded between the outer sides of the mounting plates and the counterweight body to provide support. Six openings 126a–126f are formed at equally spaced positions along the length of mounting plate 118, and aligned therewith are six openings 127 formed through the opposite mounting plate 120.

Shank 94 is flared outwardly at its lower end 130, and a pair of transverse openings 132 are formed through this end. The transverse openings are sized commensurate with the mounting plate openings. The shank openings are also spaced apart in a longitudinal direction commensurate with the longitudinal spacing between the mounting plate openings. With the shank lower end inserted between the mounting plates, as illustrated in FIG. 8, the two shank openings can be positioned in alignment with a corresponding pair of openings in the mounting plates. With this arrangement there are five possible positions at the which the shank can be mounted longitudinally of the counterweight body. FIG. 7 illustrates the mounting of the shank at a central position in which the shank holes are in alignment with the innermost pairs of mounting plate openings 126c and 126d. Steel pins or bolts 136 and 138 are inserted through the aligned openings, as illustrated in FIG. 8, and secured by lock pins 140.

With the bolts 136 and 138 removed the mounting location of the shank on the counterweight body can be changed by moving the shank openings into alignment with a selected pair of mounting plate openings so that the center of gravity of the body is correspondingly shifted fore or aft. In the illustrated embodiment with six openings in each mounting plate there are four such positions in addition to the middle position illustrated in FIG. 7. One additional position is with the shank openings in alignment with openings 126a and 126b of plate 118, and with the bolts mounted through the aligned openings of both mounting plates the counterweight body is located so that its center of gravity is at an extreme distance aft of the tractor. Another position is with the shank openings in alignment with plate openings 126b and 126c where the center of gravity of the body is intermediate the extreme aft position and the middle position. Another position is with the shank openings in alignment with plate openings 126e and 126f where the body is at its extreme position toward the tractor. Another position is with the shank openings in alignment with plate openings 126d and 126e where the body is at a position intermediate the extreme fore and middle positions. As desired, the shank 94 can be released from housing 98 for repositioning between the mounting plates 118, 120.

The capability of selectively adjusting the longitudinal position of the counterweight body so that its center of gravity can be moved fore and aft relative to the tractor permits the counterweight assembly to be adapted to fit the requirements of different slopes. For example, when operating on relatively steep slopes, counterweight body 92 can be moved to its extreme aft position to increase the longitudinal distance between CG-R and CG-T for increased traction. When working on slopes of lesser incline, the body can be remounted to one of the positions closer to the tractor for optimum weight distribution.

While the foregoing embodiments are at present considered to be preferred it is understood that numerous variations and modifications may be made therein by those skilled in the art and it is intended to cover in the appended claims all such variations and modifications as fall within the true spirit and scope of the invention.

What is claimed is:

1. A combination counterweight and crawler tractor assembly for enhancing weight distribution over the tractor's tracks to achieve improved traction and stability while working on steep slopes and grades, comprising a crawler tractor having a center of gravity CG-T which is located between its front and rear ends, said front end supporting a dozer tool, a counterweight body which is elongated along an axis transverse to the longitudinal axis of the tractor, a shank having a lower end and an attachment end projecting upwardly from the body, means for mounting the shank on the counterweight body, support means for supporting the counterweight body at a predetermined extension distance rearwardly from the tractor, said counterweight body and shank having a combined weight which is at least substantially 11% of the gross weight of the tractor whereby the resultant center of gravity CG-R is displaced a predetermined distance rearwardly from CG-T, said support means including a support arm structure having a proximal end and a distal end, means for mounting said proximal end of the support arm structur on the tractor rear end, a housing having a lower end and an upper end, means for mounting the housing lower end on the distal end of the support arm structure for pivotal movement in a substantially upright plane, linkage means for linking the upper end of the housing to the tractor rear end, and connecting means for connecting the attachment end of the shank to the housing.

2. A counterweight assembly as in claim 1 in which the shank is mounted at the transverse midspan of the counterweight body.

3. A counterweight assembly for use with a crawler tractor for enhancing weight distribution over the tractor's tracks to achieve improved traction and stability while working on steep slopes and grades, the center of gravity CG-T of the tractor being located between its front and rear ends, said front end supporting a dozer tool, the assembly comprising the combination of a counterweight body which is elongated along an axis transverse to the longitudinal axis of the tractor said counterweight body has opposite ends which extend outwardly and upwardly at a predetermined angle from horizontal whereby optimum clearance is provided between the ends and ground during operation of the tractor, a shank having a lower end and an attachment end projecting upwardly from the body, means for mounting the shank on the counterweight body, support means for supporting the counterweight body at a predetermined extension distance rearwardly from the tractor, said counterweight body having a weight which is sufficient to shift the gross weight of the tractor whereby the resultant center of gravity CG-R is displaced a predetermined distance of at least one foot rearwardly from CG-T, said support means including a support arm structure having a proximal end and a distal end, means for mounting said proximal end of the support arm structure on the tractor rear end, a housing having a lower end and an upper end, means for mounting the housing lower end on the distal end of the support arm structure for pivotal movement in a substantially upright plane, linkage means for linking the upper end of the housing to the tractor rear end, and connecting means for connecting the attachment end of the shank to the housing.

4. A counterweight assembly as in claim 3 in which said predetermined angle is in the range of 10° to 30°.

5. A counterweight assembly as in claim 1 in which the support arm structure is pivotally mounted on the tractor rear end.

6. A counterweight assembly as in claim 5 in which said linkage means includes actuator means for selectively pivoting the housing in said upright plane and thereby move the counterweight body between raised and lowered positions.

7. A counterweight assembly as in claim 1 in which the connecting means includes means for releasably securing the attachment end of the shank to the lower end of the housing.

8. A counterweight assembly as in claim 1 in which said linkage means comprises hydraulic actuator means which is selectively extensible and retractable for pivoting the housing back and forth in said upright plane.

9. A counterweight assembly for use with a crawler tractor for enhancing weight distribution over the tractor's tracks to achieve improved traction and stability while working on steep slopes and grades, the center of gravity CG-T of the tractor being located between its front and rear ends, said front end supporting a dozer tool, the assembly comprising the combination of a counterweight body having a predetermined weight, a shank having a lower end and an attachment end projecting upwardly from the body, means for mounting the shank on the counterweight body, support means for supporting the counterweight body at a predetermined extension distance rearwardly from the tractor whereby the gross weight of the tractor with the counterweight body produces a resultant center of gravity CG-R which is displaced a predetermined distance rearwardly from CG-T, said support means including a support arm structure having a proximal end and a distal end, means for mounting said proximal end of the support arm structure on the tractor rear end, a housing having a lower end and an upper end, means for mounting the housing lower end on the distal end of the support arm structure for pivotal movement in a substantially upright plane, linkage means for linking the upper end of the housing to the tractor rear end, connecting means for connecting the attachment end of the shank to the housing, said counterweight body being elongated along an axis which is longitudinal of the tractor, and said means for mounting the shank on the counterweight body includes means for releasably securing the lower end of the shank to the counterweight body at a selected position longitudinally of the body whereby said extension distance at which the body is supported rearwardly from the tractor is selectively varied in accordance with operating conditions of the tractor.

10. A counterweight assembly as in claim 9 in which said means for releasably securing the shank to the body includes means providing a plurality of attachment positions which are spaced apart longitudinally of the body, and means for releasably securing the lower end of the shank to a selected one of said attachment positions.

11. A counterweight assembly as in claim 10 in which said means for mounting the shank to the body includes a pair of upstanding side plates mounted longitudinally along the upper side of the counterweight body, said side plates being transversely spaced apart a distance sufficient to permit the lower end of the shank to fit therebetween, at least one opening formed transversely through the lower end of the shank, said means providing the plurality of attachment positions including a plurality of openings formed transversely through the side plates at a plurality of positions which are spaced apart longitudinally of the body, said openings in the side plates being sized commensurate with said opening into lower end of the shank, and at least one mounting pin releasably mounted through the side plate openings of the selected position and the aligned opening in the lower end of the shank.

12. A counterweight assembly for use with a crawler tractor for enhancing weight distribution over the tractor's tracks to achieve improved traction and stability while working on steep slopes and grades, the center of gravity CG-T of the tractor being located between its front and rear ends, said front end supporting a dozer tool, the assembly comprising the combination of a counterweight body having a predetermined weight, a shank having a lower end and an attachment end projecting upwardly from the body, means for mounting the shank on the counterweight body, support means for supporting the counterweight body at a predetermined extension distance rearwardly from the tractor whereby the gross weight of the tractor with the counterweight body produces a resultant center of gravity CG-R which is displaced a predetermined distance rearwardly from CG-T, said support means including a support arm structure having a proximal end and a distal end, means for mounting said proximal end of the support arm structure on the tractor rear end, a housing having a lower end and an upper end, means for mounting the housing lower end on the distal end of the support arm structure for pivotal movement in a substantially upright plane, linkage means for linking the upper end of the housing to the tractor rear end, connecting means for connecting the attachment end of the shank to the housing, said counterweight body being comprised of a pair of clusters of metal bars, said clusters being positioned on opposite sides of said longitudinal axis and spaced apart a distance which is greater than the width of the lower end of said housing, said housing lower end nesting in the space between the clusters when the counterweight body is mounted on the housing.

* * * * *